United States Patent
Tan et al.

(10) Patent No.: US 11,262,612 B2
(45) Date of Patent: Mar. 1, 2022

(54) TRANSPARENT DISPLAY PANEL AND TRANSPARENT DISPLAY DEVICE

(71) Applicant: BOE TECHNOLOGY GROUP CO., LTD., Beijing (CN)

(72) Inventors: Jifeng Tan, Beijing (CN); Haiyan Wang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 150 days.

(21) Appl. No.: 16/757,659

(22) PCT Filed: May 14, 2019

(86) PCT No.: PCT/CN2019/086731
§ 371 (c)(1),
(2) Date: Apr. 20, 2020

(87) PCT Pub. No.: WO2019/218984
PCT Pub. Date: Nov. 21, 2019

(65) Prior Publication Data
US 2020/0326584 A1     Oct. 15, 2020

(30) Foreign Application Priority Data
May 15, 2018   (CN) .......................... 201810461566.2

(51) Int. Cl.
*G02F 1/1335*  (2006.01)
*G02F 1/1343*  (2006.01)
*G02F 1/137*  (2006.01)

(52) U.S. Cl.
CPC ........ *G02F 1/133514* (2013.01); *G02F 1/137* (2013.01); *G02F 1/13439* (2013.01);
(Continued)

(58) Field of Classification Search
None
See application file for complete search history.

*Primary Examiner* — Edward J Glick
*Assistant Examiner* — David Y Chung
(74) *Attorney, Agent, or Firm* — Womble Bond Dickinson (US) LLP

(57) ABSTRACT

A transparent display panel and a transparent display device are disclosed. The transparent display panel comprises a color filter substrate, an electrode layer, a blue phase liquid crystal layer configured to modulate an incident collimated natural light, and a light guide plate. The color filter substrate comprises a black matrix and pixel regions which are surrounded by the black matrix and arranged in a matrix, and each of the pixel regions on the color filter substrate is provided with a light shielding part at a central position, and an opening region surrounded by the light shielding part and the black matrix. The light guide plate is provided with a light exit region on a side close to the blue phase liquid crystal layer, the light exit region is arranged to correspond to the light shielding part in position, and in case the electrode layer does not apply a driving voltage to the blue phase liquid crystal layer, the collimated natural light which passes through the light exit region is incident on the light shielding part and is blocked by the light shielding part. The electrode layer is configured to apply the driving voltage to the blue phase liquid crystal layer to form a liquid crystal grating, and the blue phase liquid crystal receives different driving voltages at different positions in one of grating periods of the liquid crystal grating, so that the collimated natural light is diffracted by the liquid crystal grating and exits through the opening region.

15 Claims, 4 Drawing Sheets

(52) U.S. Cl.
CPC .. *G02F 1/133512* (2013.01); *G02F 1/134309* (2013.01); *G02F 1/13793* (2021.01); *G02F 2201/121* (2013.01); *G02F 2201/123* (2013.01); *G02F 2201/30* (2013.01); *G02F 2203/03* (2013.01)

TRANSPARENT DISPLAY PANEL AND TRANSPARENT DISPLAY DEVICE

RELATED APPLICATIONS

The present application is a 35 U.S.C. 371 national stage application of PCT International Application No. PCT/CN2019/086731, filed on May 14, 2019, which claims the benefit of Chinese Patent Application No. 201810461566.2, filed on May 15, 2018, the entire disclosures of which are incorporated herein by reference.

TECHNICAL FIELD

The present disclosure relates to the field of display technologies, and particularly to a transparent display panel and a transparent display device.

BACKGROUND

In the field of display technologies, a transparent liquid crystal display panel usually comprises an upper polarizer sheet and a lower polarizer sheet. To improve the uniformity of the output light, the transparent liquid crystal display panel usually further comprises, for example, a prismatic film, a diffusion film, and a reflection sheet. These components affect the overall transmittance of the transparent liquid crystal display panel, which causes a relatively low overall light efficiency of a display device.

SUMMARY

In a first aspect, the present disclosure provides a transparent display panel, comprising: a color filter substrate, an electrode layer, a blue phase liquid crystal layer configured to modulate an incident collimated natural light, and a light guide plate, wherein the color filter substrate comprises a black matrix and pixel regions which are surrounded by the black matrix and arranged in a matrix, and each of the pixel regions on the color filter substrate is provided with a light shielding part at a central position, and an opening region surrounded by the light shielding part and the black matrix, wherein the light guide plate is provided with a light exit region on a side close to the blue phase liquid crystal layer, the light exit region is arranged to correspond to the light shielding part in position, and in case the electrode layer does not apply a driving voltage to the blue phase liquid crystal layer, the collimated natural light which passes through the light exit region is incident on the light shielding part and is blocked by the light shielding part, and wherein the electrode layer is configured to apply the driving voltage to the blue phase liquid crystal layer to form a liquid crystal grating, and the blue phase liquid crystal receives different driving voltages at different positions in one of grating periods of the liquid crystal grating, so that the collimated natural light is diffracted by the liquid crystal grating and exits through the opening region.

In one or more embodiments, an orthographic projection of the light exit region on the light guide plate falls within an orthographic projection of the light shielding part on the light guide plate.

In one or more embodiments, the electrode layer comprises common electrodes and pixel electrodes. Each of the pixel electrodes comprises a plurality of strip electrodes which extend in a same direction and are arranged in order. Each of the pixel regions corresponds to a plurality of grating periods out of the grating periods, and each of the grating periods is provided with a plurality of strip electrodes which are arranged in a corresponding manner.

In one or more embodiments, in one of the grating periods, the plurality of strip electrodes are arranged in a same layer and are arranged symmetrically with respect to a center of the corresponding grating period, the strip electrodes close to the center are fed with a driving voltage higher than a driving voltage for the strip electrodes away from the center, and the strip electrodes at symmetrical positions are fed with a same driving voltage.

In one or more embodiments, in one of the grating periods, the plurality of strip electrodes are fed with a same driving voltage and are arranged on different insulating layers, the plurality of strip electrodes are arranged symmetrically with respect to a center of the corresponding grating period, the strip electrodes close to the center have a larger distance from the blue phase liquid crystal than the strip electrodes away from the center, and the strip electrodes at symmetrical positions have a same distance from the blue phase liquid crystal.

In one or more embodiments, the electrode layer comprises common electrodes and pixel electrodes, the common electrodes and the pixel electrodes are arranged on a same side of the blue phase liquid crystal layer, each of the pixel electrodes comprises a plurality of strip electrodes, the strip electrodes are fed with a same driving voltage, and two grating periods are formed between two neighboring strip electrodes.

In one or more embodiments, the strip electrodes are transparent oxide semiconductor electrodes, and are configured to be fed with driving voltages through different data lines.

In one or more embodiments, the color filter substrate comprises a color filter layer, and the color filter layer is a quantum dot color filter layer or a color filter layer doped with scattering particles.

In one or more embodiments, the light exit region of the light guide plate is provided with a light extract grating, and the collimated natural light which passes through the light extract grating is incident on the blue phase liquid crystal layer.

In one or more embodiments, the light guide plate comprises a light shielding part and a light exit region surrounded by the light shielding part on a light exit surface, and the collimated natural light which passes through the light exit region is incident on the blue phase liquid crystal layer.

In one or more embodiments, the grating period is smaller than 10 μm.

In a second aspect, the present disclosure provides a transparent display device, which comprises any one of the transparent display panel of the first aspect, and a light source configured to provide the collimated natural light for the transparent display panel.

In one or more embodiments, the light source is arranged as a side entry type or direct type light source for the light guide plate.

BRIEF DESCRIPTION OF THE DRAWINGS

Implementations of the present disclosure will be described in more detail hereinafter with reference to the accompanying drawings.

DETAILED DESCRIPTION OF EMBODIMENTS

In order to explain the technical solutions in the embodiments of the present disclosure or the prior art more clearly, the drawings to be used in the description of the embodiments or the prior art will be introduced briefly in the following. Apparently, the drawings described below are only some embodiments of the present disclosure. The ordinary skilled person in the art, on the premise of not paying any creative work, can also obtain other drawings from these drawings.

A liquid crystal display panel which realizes gray scale display without an upper polarizer sheet and a lower polarizer sheet has been proposed. However, only one type of polarized light can be modulated. As a result, a considerable portion of light can not be extracted via refraction and/or diffraction light exit, so that the display panel has a reduced overall light efficiency.

In the field of display technologies, a liquid crystal display panel comprises a first substrate and a second substrate which are arranged oppositely. A liquid crystal layer is arranged between the first substrate and the second substrate. Both a backside of the first substrate and a backside of the second substrate are provided with a polarizer sheet. The deflection of liquid crystals is controlled by applying a driving voltage, and the two polarizer sheets are controlled, so as to realize gray scale display. The light emitted by a light source in a back-light source is guided into a lower polarizer sheet by a light guide plate. The light is then incident onto the liquid crystal display panel via a lower polarizer sheet, and finally output via an upper polarizer sheet, so that the liquid crystal display panel is enabled to display pictures. In this process, due to the application of the upper polarizer sheet and the lower polarizer sheet, the existing liquid crystal display panel has a relatively low overall transmittance and poor display effect.

Figure 1:
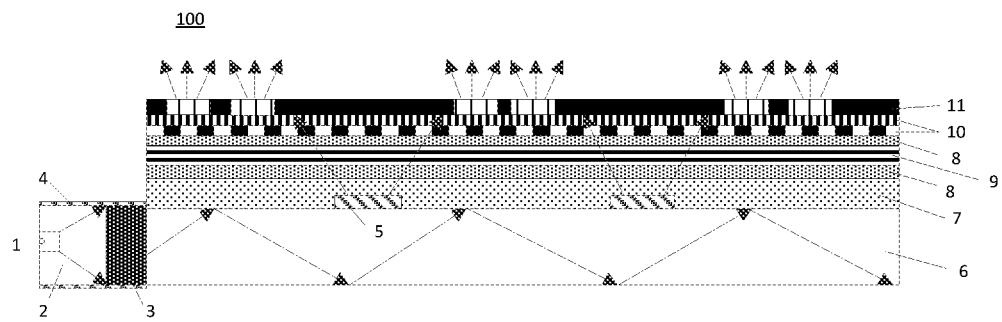
FIG. 1 is a structural view for illustrating a known display panel.

As shown in FIG. 1, a known display panel 100 comprises a light source component 1, a light bar 2, a coupling grating 3, a reflection sheet 4, a light extract grating 5, a light guide plate 6, a filling layer 7, an alignment layer 8, a liquid crystal layer 9, an electrode layer 10, and a first substrate 11.

The light source component 1 comprises the light bar 2, the coupling grating 3, and the reflection sheet 4. The light source component 1 emits light into the light guide plate 6. The light is diffracted or reflected by the light extract grating 5, so that it can be collimated by and output from the light extract grating 5. In case the electrode layer 10 does not apply a voltage to the liquid crystal layer 9, the incident collimated light is absorbed by a black matrix of the first substrate 11, and no light is output for display, so that the display panel is in a dark state. In case the electrode layer 10 applies a voltage to the liquid crystal layer 9, liquid crystal molecules in the liquid crystal layer 9 are periodically arranged to form a liquid crystal grating. The driving voltage applied to liquid crystal molecules in the liquid crystal layer 9 is controlled in a manner that the incident light is diffracted to different extent by a liquid crystal lens formed by the liquid crystal grating. In this way, any gray scale in L0-L255 is realized without the upper polarizer sheet and the lower polarizer sheet.

In the display panel 100 as described above, no polarizer sheet is needed to realize gray scale display. However, since only one type of polarized light can be modulated by liquid crystal molecules in the liquid crystal layer 9, a considerable portion of natural light can not be extracted via diffraction. This reduces an overall light extraction efficiency of the display panel 100.

Figure 2:
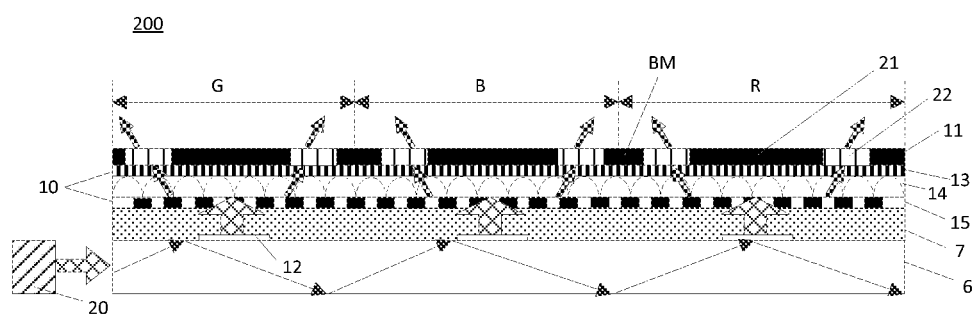
FIG. 2 is a structural view for illustrating transparent display panel in an embodiment of the present disclosure.

Thus, as shown in FIG. 2, in an embodiment of the present disclosure, a transparent display panel 200 capable of modulating natural light. The transparent display panel 200 comprises: a color filter substrate 11, the electrode layer 10, a blue phase liquid crystal layer 14 for modulating an incident collimated natural light, and the light guide plate 6. The color filter substrate 11 comprises a black matrix BM, and pixel regions which are surrounded by the black matrix and arranged in a matrix. On the color filter substrate, each of the pixel regions is provided with a light shielding part 21 at its central position, and an opening region 22 which is surrounded by the light shielding part 21 and the black matrix BM (e.g., arranged between the light shielding part 21 and the black matrix BM). The light guide plate 6 is provided with a light exit region 12 at a side close to the blue phase liquid crystal layer 14. The light exit region 12 is arranged to correspond to the light shielding part 21, so that the collimated natural light which passes through the light exit region 12 is incident on the light shielding part 21 and is blocked by the light shielding part 21. For example, an orthographic projection of the light exit region 12 on the light guide plate 6 falls within an orthographic projection of the light shielding part 21 on the light guide plate 6. The electrode layer 10 applies a driving voltage to the blue phase liquid crystal layer 14 to form a liquid crystal grating. The blue phase liquid crystals at different positions in one grating period of the liquid crystal grating receive different driving voltages, so that the collimated natural light is output from the opening region 22 via diffraction of the liquid crystal grating.

As compared with the current liquid crystal, the blue phase liquid crystal has been widely concerned due to advantages of short response time, high display resolution, reduced dynamic artifact. The operation principle of the blue phase liquid crystal display panel is based on the fact that the blue phase liquid crystal meets Kerr effect under a low electric field:

$$\Delta n = \lambda K E^2 \quad (1),$$

wherein $\Delta n$ is field-induced birefringence, $\lambda$ is the wavelength of the incident light, E is an external electric field, K is Kerr coefficient. Namely, the blue phase liquid crystals macroscopically exhibit optical isotropy, while upon application of an electric field, the blue phase liquid crystal molecules are aligned in a direction of the electric field, so as to exhibit optical anisotropy. During operation of the blue phase liquid crystal display panel, an external electric field is applied to the blue phase liquid crystal through the pixel electrodes and the common electrodes. Under the effect of the external electric field, the blue phase liquid crystal can be changed into an optically uniaxial crystal, which has an optical axis with a direction parallel with the direction of the electric field.

According to equation (1), in case the incident wavelength is fixed, the applied driving voltage is inversely proportional to the Kerr coefficient of the blue phase liquid crystal. In this way, by controlling the applied driving voltage, the blue phase liquid crystal can be made to exhibit different optical anisotropy.

In the present embodiment, according to the feature of the blue phase liquid crystal, the electrode layer with different structures is designed. By controlling the electrode layer 10, a driving voltage is applied to the blue phase liquid crystal to form a liquid crystal grating, so that the blue phase liquid crystal at different positions in one grating period of the liquid crystal grating receives different driving voltages. In this way, the natural light is modulated, and the natural light is diffracted by the liquid crystal grating and output through the opening region 22 of the first substrate.

In a specific example, the natural light can be decomposed into a polarized light with vibration perpendicular to a plane and a polarized light with in-plane vibration. In order to decrease the energy loss of the incident light, a collimated natural light with good uniformity is provided as the light which is incident on the display panel 200.

In embodiments of the present disclosure, the transparent display panel comprises the blue phase liquid crystal and a modified electrode structure, to modulate the natural light. This can effectively increase the overall light transmissivity of the display panel, and thus increase the display effect of the display panel.

Figure 3:
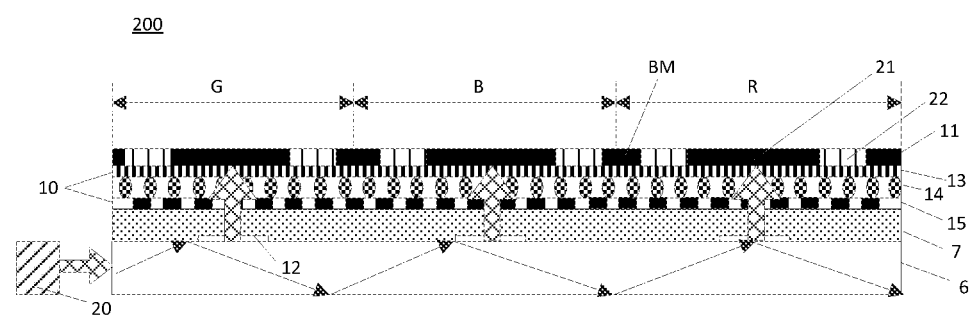
FIG. 3 is a schematic view for illustrating a dark state of a transparent display panel in an embodiment of the present disclosure.

FIG. 3 is a schematic view for a dark state display of the transparent display panel 200. On the color filter substrate 11 of the display panel, each of the pixel regions is provided with the light shielding part 21 at the central position, and the opening region 22 surrounded by the black matrix BM and the light shielding part 21. The incident collimated natural light falls within an orthographic projection of the light shielding part 21 on the light guide plate 6. Namely, the light shielding part 21 has a width which is calculated according to a width of the light exit region 12 for the collimated natural light. The width of the light shielding part 21 is set in such a manner that the light shielding part 21 can block the incident collimated natural light with a certain range of incidence angle, so as to realize the dark state display of the display panel 200. Namely, in case the electrode layer 10 does not apply a driving voltage to the blue phase liquid crystal layer 14, the blue phase liquid crystal has a refractive index with a fixed value n1, and the collimated natural light incident on the color filter substrate 11 is absorbed by the light shielding part 21 of the color filter substrate 11. As a result, no light is output for display, and this is the dark state display state of the transparent display panel.

FIG. 2 is a structural view of the transparent display panel 200, in which the gray scale display of is transparent display panel is also shown. As shown, the display panel 200 comprises a plurality of pixel units, and each of the pixel units comprises a plurality of sub-pixels. In the present embodiment, each of the pixel units comprises three sub-pixels, i.e., a R (red) sub-pixel, a G (green) sub-pixel, and a B (blue) sub-pixel. The electrode layer 10 applies a driving voltage to the blue phase liquid crystal layer 14 to form a liquid crystal grating. In this case, the blue phase liquid crystal exhibits optical anisotropy along the direction of electric field. The pixel region of each sub-pixel corresponds to a plurality of grating periods, and both polarized light in two directions of the incident collimated natural light can be output from the opening region 22 between the light shielding part 21 by means of diffraction by the liquid crystal grating, so as to realize gray scale display.

The electrode layer 10 comprises common electrodes 13 and pixel electrodes 15. Each of the pixel electrodes comprises a plurality of strip electrodes which extend in a same direction and are arranged in order. The strip electrodes are transparent oxide semiconductor electrodes, for example, ITO or IZO electrode strips, and are fed with a driving voltage through different data lines. Each of the pixel regions corresponds to a plurality of grating periods out of the grating periods, and each of the grating periods is provided with a plurality of strip electrodes which are arranged in a corresponding manner.

Figure 4:
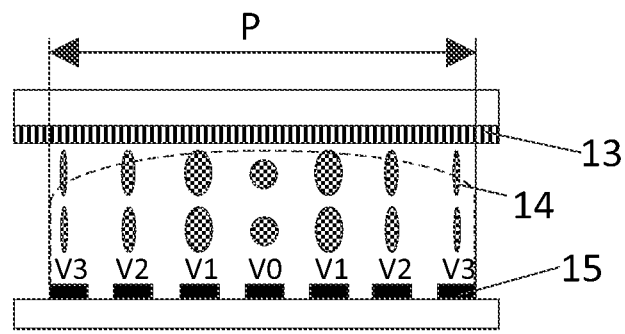
FIG. 4 is a structural view for illustrating an electrode layer in an embodiment of the present disclosure.

FIG. 4 shows different driving voltages received by the blue phase liquid crystal at different positions in one grating period. In an embodiment of the present disclosure, in one of the grating periods, the plurality of strip electrodes are arranged in a same layer and are arranged symmetrically with respect to a center of the corresponding grating period, the strip electrodes close to the center are fed with a driving voltage higher than a driving voltage for the strip electrodes away from the center, and the strip electrodes at symmetrical positions are fed with a same driving voltage. Namely, the strip electrodes corresponding to different positions are fed with different driving voltages. The common electrodes and pixel electrodes are arranged on respective side of the blue phase liquid crystal layer. The common electrodes 13 are arranged on a side of the color filter substrate close to the blue phase liquid crystal layer, and the pixel electrodes 15 consisting of the plurality of strip electrodes are arranged on a side of the light guide plate close to the blue phase liquid crystal layer. Upon application of a driving voltage to the strip electrodes, a vertical electric field is formed, and the blue phase liquid crystal layer 14 forms liquid crystal gratings which are arranged periodically. In each one of the grating periods, the blue phase liquid crystal is stretched in the direction of electric field, i.e., in the vertical direction, and exhibits optical anisotropy.

In particular, as for a plurality of strip electrodes of the strip electrodes which correspond to one grating period P, the refractive index at different positions of the grating period is calculated according to actual demand, and the driving voltage for the respective the strip electrode is set according to the refractive index. In the present embodiment, description is made to an example in which one grating period corresponds to seven strip electrodes. The strip electrodes are arranged symmetrically with respect to a central point of the grating period. With the increase of the sequence of the strip electrodes (e.g., the sequence of the strip electrodes increases from left to right in FIG. 4), the driving voltage for the strip electrodes firstly decreases and then increases, i.e., V3>V2>V1>V0. Any two strip electrodes which are arranged symmetrically with respect to the central point of the grating period are fed with a same driving voltage.

In the vertical electric field, the blue phase liquid crystal exhibits optical anisotropy along the direction of electric field. The blue phase liquid crystal has a refractive index of n1 at the dark state. With the increase of the applied voltage, the refractive index of the blue phase liquid crystal varies gradually from n1. The refractive index in the long axis direction changes to n2, and the refractive index in the short axis direction changes to n3. In case the applied voltage become saturated, the refractive index in the long axis direction finally changes to ne, and the refractive index in the short axis direction finally changes to no, wherein ne>n2>n3>no, and ne>n1>no. The incident collimated natural light is decomposed into the polarized light with vibration perpendicular to the plane and the polarized light with in-plane vibration. In the vertical electric field, both the polarized light with vibration perpendicular to the plane and the polarized light with in-plane vibration experience the variation of refractive index in the short axis direction. The polarized light with vibration perpendicular to the plane experiences the variation of refractive index the polarized light from n1 to no, and the polarized light with in-plane vibration also experiences the variation of refractive index from n1 to no.

Thus, in the present embodiment, the transparent display panel can modulate two kinds of polarized light of the natural light. As compared with the existing technique in which only one type of polarized light can be modulated, this effectively increases the overall light extraction efficiency of the display panel.

Figure 5:
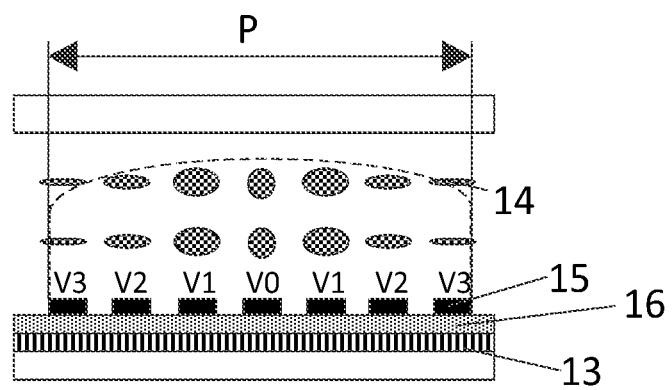
FIG. 5 is a structural view for illustrating an electrode layer in an embodiment of the present disclosure.

In the above embodiments, under the effect of the vertical electric field, two kinds of polarized light of the collimated natural light experience a same variation of refractive index. In another embodiment of the present disclosure, as shown in FIG. 5, the common electrodes 13 and the pixel electrodes 15 are arranged on a same side of the blue phase liquid crystal layer 14. In the present embodiment, the common electrodes 13 and the pixel electrodes 15 are arranged on a side of the light guide plate close to the blue phase liquid crystal layer, and an insulating layer 16 is provided between the common electrodes 13 and the pixel electrodes 15. Upon application of a driving voltage, a horizontal electric field is formed, and the blue phase liquid crystal layer forms liquid crystal gratings which are arranged periodically. In one grating period P, the blue phase liquid crystal molecules are stretched in the direction of electric field, i.e., in the horizontal direction, and exhibits optical anisotropy. Similarly, in the present embodiment, one grating period corresponds to seven strip electrodes. The strip electrodes are arranged symmetrically with respect to a central point of the grating period. With the increase of the sequence of the strip electrodes (e.g., the sequence of the strip electrodes increases from left to right in FIG. 5), the driving voltage for the strip electrodes firstly decreases and then increases, i.e., V3>V2>V1>V0.

In the horizontal electric field, the blue phase liquid crystal exhibits optical anisotropy along the direction of electric field. The refractive index of the blue phase liquid crystal gradually varies with the increase of the applied voltage. The refractive index in the long axis direction changes from n1 to n2 and then changes to ne, and the refractive index in the short axis direction changes from n1 to n3 and then changes to no, wherein ne>n2>n3>no, and ne>n1>no. The polarized light with vibration perpendicular to the plane of the incident collimated natural light experiences the variation of refractive index in the short axis direction, i.e., from n1 to no. The polarized light with in-plane vibration of the incident collimated natural light experiences the variation of refractive index in the long axis direction, i.e., from n1 to ne.

Thus, the transparent display panel in the present embodiment can also modulate two kinds of polarized light of the natural light, which effectively increases the overall light extraction efficiency of the display panel.

In the two embodiments as described above, the strip electrodes corresponding to different positions in one grating period are set at different driving voltages, so as to modulate the natural light. Namely, each of the strip electrodes is fed with a driving voltage through different data lines. In this case, a complicated driving circuit is arranged in the limited space of the display panel for purpose of modulating the natural light.

Figure 6:
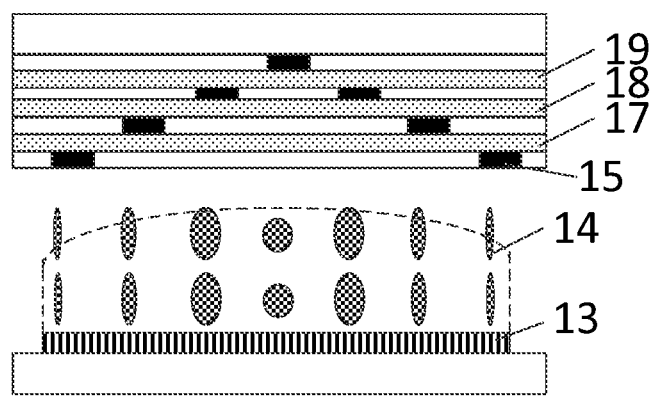
FIG. 6 is a structural view for illustrating an electrode layer in an embodiment of the present disclosure.

In order to simplify the design of the driving circuit, in other embodiments of the present disclosure, as shown in FIG. 6, in one of the grating periods, the plurality of strip electrodes are fed with a same driving voltage and are arranged on different insulating layers. The plurality of strip electrodes are arranged symmetrically with respect to a center of the corresponding grating period, the strip electrodes close to the center have a larger distance from the blue phase liquid crystal than the strip electrodes away from the center, and the strip electrodes at symmetrical positions have a same distance from the blue phase liquid crystal. Namely, the strip electrodes corresponding to different positions are controlled to have different distances from the blue phase liquid crystal layer, so that the blue phase liquid crystal at different positions receives different driving voltages. In this way, the blue phase liquid crystal at different positions has different refractive index. In the present embodiment, with the increase of the sequence of the strip electrodes, the distance from the strip electrodes to the blue phase liquid crystal layer firstly increases and then decreases. Any two strip electrodes which are arranged symmetrically with respect to the central point of the grating period have a same distance to the blue phase liquid crystal layer.

In particular, the common electrodes and pixel electrodes are arranged on respective side of the blue phase liquid crystal layer. The common electrodes 13 are arranged on a side of the light guide plate close to the blue phase liquid crystal layer, and the pixel electrodes 15 consisting of the plurality of strip electrodes are arranged on a side of the color filter substrate close to the blue phase liquid crystal layer, so as to form the vertical electric field. Similarly, one grating period corresponds to seven strip electrodes. The strip electrodes are fed with a same driving voltage. The distance from the strip electrodes to the blue phase liquid crystal is arranged symmetrically with respect to the central point of the grating period, and this distance gradually decreases. By arranging the first insulating layer 17, a second insulating layer 18 and a third insulating layer 19 among the strip electrodes, the distance of the strip electrodes gradually increases. In the present embodiment, the first insulating layer 17, the second insulating layer 18 and the third insulating layer 19 are $Si_3N_4$. According to practical measurements, in case the thickness of the insulating layer increases by 1 μm, the received driving voltage of the blue phase liquid crystal molecules decreases by 0.5V. Thus, the driving voltage received by the blue phase liquid crystal can be calculated according to the required refractive index at different positions of the grating period, and thus the required thickness of the insulating layers can be calculated.

Similar with the above embodiments about the vertical electric field, in the vertical electric field, the blue phase liquid crystal exhibits optical anisotropy along the direction of electric field. The blue phase liquid crystal has a refractive index of n1 at the dark state. With the increase of the driving voltage received by the blue phase liquid crystal, the refractive index of the blue phase liquid crystal varies gradually from n1. The refractive index in the long axis direction changes from n1 to n2 and then changes to ne, and the refractive index in the short axis direction changes from n1 to n3 and then changes to no, wherein ne>n2>n3>no, and ne>n1>no. The incident collimated natural light is decomposed into the polarized light with vibration perpendicular to the plane and the polarized light with in-plane vibration. In the vertical electric field, both the polarized light with vibration perpendicular to the plane and the polarized light with in-plane vibration experience the variation of refractive index in the short axis direction. The polarized light with vibration perpendicular to the plane experiences the variation of refractive index the polarized light from n1 to no, and the polarized light with in-plane vibration also experiences the variation of refractive index from n1 to no.

Figure 7:
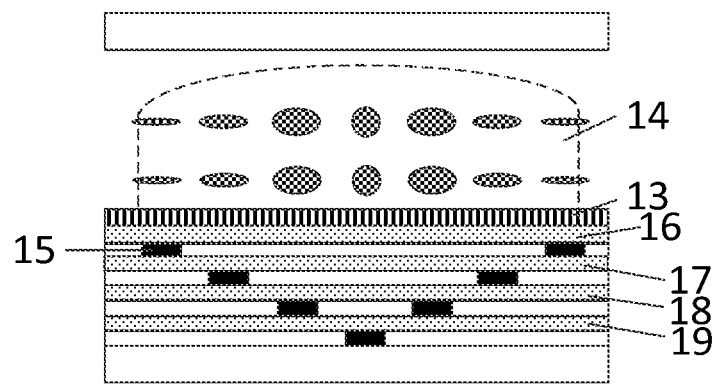
FIG. 7 is a structural view for illustrating an electrode layer in an embodiment of the present disclosure.

Under the effect of the vertical electric field, two kinds of polarized light of the collimated natural light experience a same variation of refractive index. Furthermore, in case these two kinds of polarized light of the collimated natural light are required to experience different variations of refractive index, as shown in FIG. 7, the common electrodes 13 and the pixel electrodes 15 consisting of the plurality of strip electrodes are arranged on a same side of the blue phase liquid crystal layer 14. In the present embodiment, the common electrodes 13 and the pixel electrodes 15 are arranged on a side of the light guide plate close to the blue phase liquid crystal layer, and the insulating layer 16 is arranged between the common electrodes 13 and the pixel electrodes 15. Upon application of a driving voltage, a horizontal electric field is formed. Similarly, one grating period corresponds to seven strip electrodes, and the strip electrodes have a same input voltage. The distance from the strip electrodes to the blue phase liquid crystal molecules are arranged symmetrically with respect to the central point of the grating period, and this distance gradually decreases. The insulating layers among the pixel electrodes comprise $Si_3N_4$. The distance for the first insulating layer 17, the second insulating layer 18 and the third insulating layer 19 gradually increase, so that different driving voltages are received by the blue phase liquid crystal molecules at different positions in one grating period.

Similar with the above embodiments about the horizontal electric field, in the horizontal electric field, the blue phase liquid crystal exhibits optical anisotropy along the direction of electric field. The refractive index of the blue phase liquid crystal gradually varies with the increase of the applied driving voltage. The refractive index in the long axis direction changes from n1 to n2 and then changes to ne, and the refractive index in the short axis direction changes from n1 to n3 and then changes to no, wherein ne>n2>n3>no, and ne>n1>no. The polarized light with vibration perpendicular to the plane of the incident collimated natural light experiences the variation of refractive index in the short axis direction, i.e., from n1 to no. The polarized light with in-plane vibration of the incident collimated natural light experiences the variation of refractive index in the long axis direction, i.e., from n1 to ne.

Thus, even if the strip electrodes are fed with a same driving voltage, in the present embodiment, the display panel can still modulate two kinds of polarized light of the natural light, and this effectively increases the overall light extraction efficiency of the display panel. It is noted that, in case the strip electrodes are fed with a same driving voltage in one grating period, data lines for supplying power to strip electrodes can be designed by a person with ordinary skill in the art as needed. For example, a same data line can be used to supply power to strip electrodes of a same driving voltage, and this simplifies the circuit design. The present embodiment is not limited in this regard.

Figure 8:
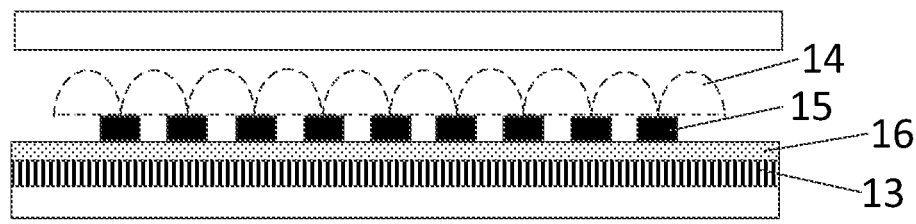
FIG. 8 is a structural view for illustrating an electrode layer in an embodiment of the present disclosure.

In order to further increase the display efficiency, realize an even stronger effect of liquid crystal grating diffraction and an even decreased liquid crystal grating period, in another embodiment of the present disclosure as shown in FIG. 8, the common electrodes 13 and the pixel electrodes 15 consisting of the plurality of strip electrodes are arranged on a same side of the blue phase liquid crystal layer 14. In the present embodiment, the common electrodes 13 and the pixel electrodes 15 are arranged on a side of the light guide plate close to the blue phase liquid crystal layer, the insulating layer 16 is arranged between the common electrodes 13 and the pixel electrodes 15, and the strip electrodes are fed with a same voltage. The strip electrodes produce a peripheral field effect. Namely, the electric field has a minimum intensity at the central point of electrode width and the central point of spacing between two electrodes, and an electric field distribution with a maximum at the middle and a minimum at either side is formed. In case the strip electrodes have a relatively small electrode period, i.e., in case two grating periods are formed between two neighboring strip electrodes, a phase morphology equivalent to the liquid crystal grating in the above embodiments can be realized. In this case, the liquid crystal lens formed by the liquid crystal grating has the strongest diffraction effect, the minimum period, and the highest display efficiency.

The liquid crystal grating in the present embodiment is equivalent to the liquid crystal grating in the above embodiments. The liquid crystal grating not only increases light extraction efficiency, but can also modulate two kinds of polarized light of the natural light.

In another specific embodiment, the color filter substrate of the transparent display panel comprises a color filter layer which is quantum dot color filter layer. In one aspect, monochromatic light with a short wavelength from the back-light source can excite quantum dots, so as to realize the colored display of the liquid crystal display panel. In another aspect, quantum dots have excellent scattering property. The quantum dot color filter layer may scatter the outgoing light, so as to increase the viewing angle of the liquid crystal display panel. Optionally, the color filter layer can also be a color filter layer doped with scattering particles. In case the scattering particles are doped to a concentration over 40%, the viewing angle of the liquid crystal display panel can be effectively increased.

Embodiments of the present disclosure further provide a transparent display panel. A collimated light source 20 of the collimated natural light is arranged as a side entry type or direct type light source for the light guide plate 6. The collimated natural light is output by the collimated light source to the light guide plate, and is incident on the display panel through the light exit region of the light guide plate.

Figure 9:
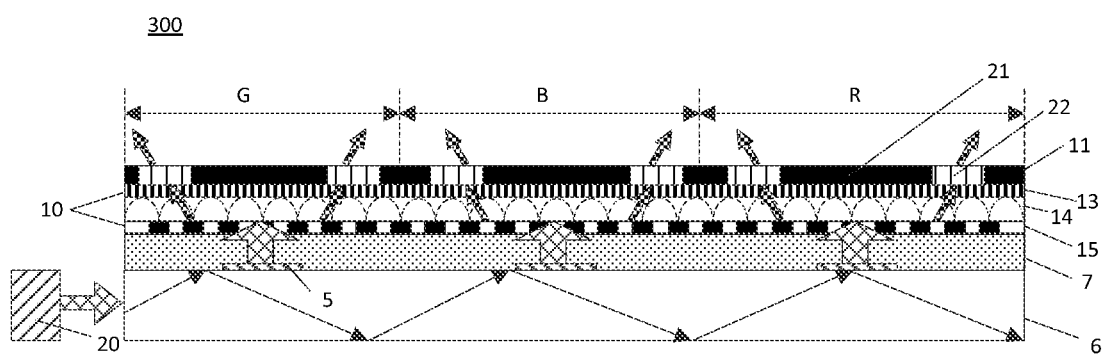
FIG. 9 is a structural view for illustrating a transparent display panel in an embodiment of the present disclosure.

In particular, as shown in FIG. 9, the collimated light source 20 of a transparent display panel 300 is arranged as a side entry type light source for the light guide plate. The light exit region 12 of the light guide plate 6 is provided with the light extract grating 5. The collimated natural light passes through the light extract grating 5, and is incident on the blue phase liquid crystal layer 14. Namely, the collimated light source 20 is arranged on a side of the light guide plate 6, and for example is the light source component 1 of FIG. 1 which comprises the light bar 2, the coupling grating 3, and the reflection sheet 4. In the light source component 1, a large angle light emitted by the light bar 2 passes through the coupling grating 3, and is gathered into a light with a small divergence angle which is larger than a critical angle for total reflection of the light in the light guide plate 6. Light which is leaked through an upper portion or lower portion of the light source component 1 can further be reflected by the reflection sheet 4 back to the light source component 1, so as to increase the utilization of light. Optionally, the light source component comprises a light source and a parabolic reflector, and the light source is arranged a focus of the parabolic reflector. Light emitted by the light source is reflected by the parabolic reflector into parallel light. This increases uniformity of light incident on the light guide plate 6. Embodiments of the present disclosure are not limited in this regard.

The natural light from the collimated light source 20 is coupled into the light guide plate 6 at an angle larger than the total reflection angle of the light guide plate 6, so as to avoid loss of the incident light. The incident light is propagated in the light guide plate 6 via total reflection, and then the collimated natural light is output to the display panel through the light extract grating 5. The collimated natural light has excellent uniformity, so that it is not necessary to arrange a prismatic film, a diffusion film and a reflection sheet in the back-light source to increase the uniformity of light from the light guide plate 6. This decreases loss of light, increases the overall light transmissivity of the display panel, and thus increases the display effect of the display panel.

Figure 10:
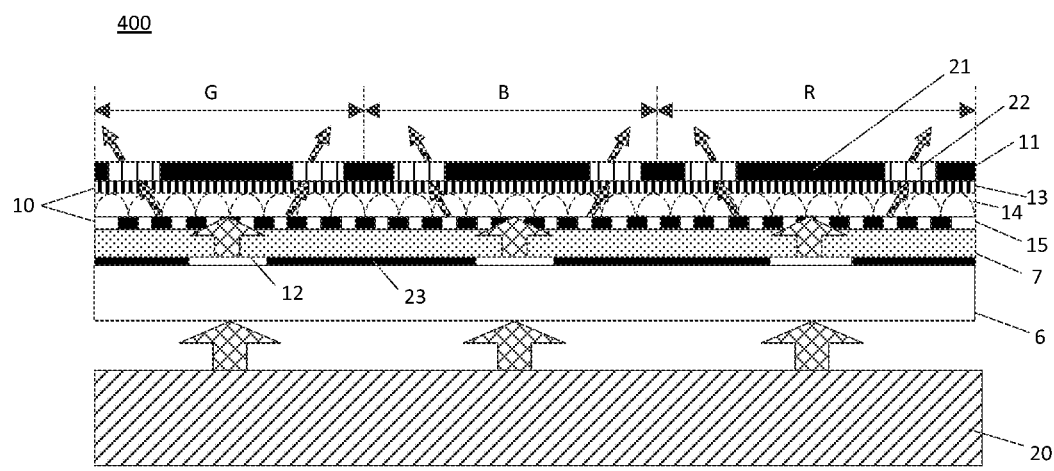
FIG. 10 is a structural view for illustrating a transparent display panel in an embodiment of the present disclosure.

As shown in FIG. 10, the collimated light source 20 of a transparent display panel 400 is arranged as a direct type light source for the light guide plate. The light exit surface of the light guide plate 6 comprises a light shielding part 23 and the light exit region 12 surrounded by the light shielding part. The collimated natural light passes through the light exit region 12 and is incident on the blue phase liquid crystal layer. Namely, light emitted by the collimated light source 20 is incident on the lower side of the light guide plate 6, passes through the light guide plate 6 and is output from the light exit region 12, and is incident on the blue phase liquid crystal layer. In this way, the natural light is modulated.

Figure 11:
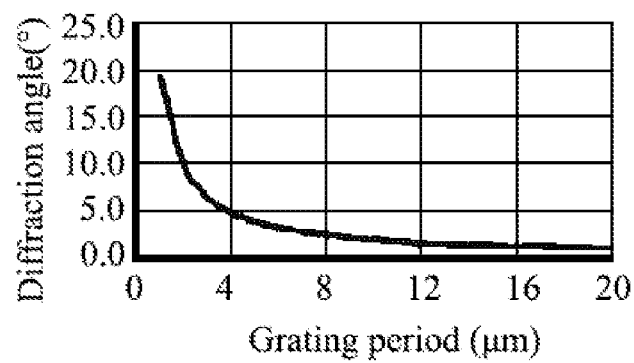
FIG. 11 is a schematic view for illustrating a relationship between a diffraction angle and a grating period.

In another embodiment of the present disclosure, the transparent display panel has a grating period smaller than 10 μm. The inventor found from experiments and tests that the diffraction angle and the grating period follows the relationship shown in FIG. 11. With the increase of the grating period, the diffraction angle decreases. When the grating period is larger than 10 μm, the diffraction angle becomes steady and the diffraction effect becomes weak. In the present embodiment, the more the number of the liquid crystal gratings formed in the limited space of the display panel is, the better effect of modulating the natural light will be obtained. Thus, the grating period is set to be smaller than 10 μm. Namely, in case the liquid crystal grating has a grating period smaller than 10 μm, the incident collimated natural light passes through the liquid crystal lens formed by the liquid crystal grating and is diffracted by the liquid crystal lens, so as to modulate the natural light. Furthermore, in case the grating period has a value in a range of [1 μm, 3 μm], i.e., not smaller than 1 μm and not larger than 3 μm, the corresponding diffraction angle range is maximum. This provides the maximum modulation effect for the natural light.

Another embodiment of the present disclosure further provides a transparent display device capable of modulating natural light, which comprises the transparent display panel as described above.

It is noted that, the structure and position of common electrodes and pixel electrodes in the display panel shall be designed by a person with ordinary skill in the art according to actual demand, and the design rules are set to meet requirements about the refractive index of the blue phase liquid crystal as needed. The structure and position comprises, but not limited to, the structure and position described in embodiments of the present disclosure.

In the transparent display panel and the display device according to embodiments of the present disclosure, the blue phase liquid crystal and the modified electrode structure are capable of modulating the natural light. Since it is not necessary to provide a polarizing sheet and an alignment layer in the display panel, the transmittance of the display panel is increased, the fabricating process is simplified, and the cell gap of the liquid crystal becomes thinner, and the response time is improved. Furthermore, since the liquid crystal grating has a small grating period in the present disclosure, the pixel unit can have a small size, so that the display panel can realize high resolution display.

It will be appreciated that the present invention is not limited to the exact construction that has been described above and illustrated in the accompanying drawings, and that various modifications and changes can be made without departing from the scope thereof. It is intended that the scope of the present invention only be limited by the appended claims.

What is claimed is:

1. A transparent display panel, comprising: a color filter substrate, an electrode layer, a blue phase liquid crystal layer configured to modulate an incident collimated natural light, and a light guide plate, wherein the color filter substrate comprises a black matrix and pixel regions which are surrounded by the black matrix and arranged in a matrix, and each of the pixel regions on the color filter substrate is provided with a light shielding part at a central position, and an opening region surrounded by the light shielding part and the black matrix, wherein the light guide plate is provided with a light exit region on a side close to the blue phase liquid crystal layer, the light exit region is arranged to correspond to the light shielding part in position, and in case the electrode layer does not apply a driving voltage to the blue phase liquid crystal layer, the collimated natural light which passes through the light exit region is incident on the light shielding part and is blocked by the light shielding part, and wherein the electrode layer is configured to apply the driving voltage to the blue phase liquid crystal layer to form a liquid crystal grating, and the blue phase liquid crystal receives different driving voltages at different positions in one of grating periods of the liquid crystal grating, so that the collimated natural light is diffracted by the liquid crystal grating and exits through the opening region.

2. The transparent display panel of claim 1, wherein an orthographic projection of the light exit region on the light guide plate falls within an orthographic projection of the light shielding part on the light guide plate.

3. The transparent display panel of claim 1, wherein the electrode layer comprises common electrodes and pixel electrodes, wherein each of the pixel electrodes comprises a plurality of strip electrodes which extend in a same direction and are arranged in order, and wherein each of the pixel regions corresponds to a plurality of grating periods out of the grating periods, and each of the grating periods is provided with a plurality of strip electrodes which are arranged in a corresponding manner.

4. The transparent display panel of claim 3, wherein in one of the grating periods, the plurality of strip electrodes are arranged in a same layer and are arranged symmetrically with respect to a center of the corresponding grating period, the strip electrodes close to the center are fed with a driving voltage higher than a driving voltage for the strip electrodes away from the center, and the strip electrodes at symmetrical positions are fed with a same driving voltage.

5. The transparent display panel of claim 3, wherein in one of the grating periods, the plurality of strip electrodes are fed with a same driving voltage and are arranged on different insulating layers, the plurality of strip electrodes are arranged symmetrically with respect to a center of the corresponding grating period, the strip electrodes close to the center have a larger distance from the blue phase liquid crystal than the strip electrodes away from the center, and the strip electrodes at symmetrical positions have a same distance from the blue phase liquid crystal.

6. The transparent display panel of claim 1, wherein the electrode layer comprises common electrodes and pixel electrodes, the common electrodes and the pixel electrodes are arranged on a same side of the blue phase liquid crystal layer, each of the pixel electrodes comprises a plurality of strip electrodes, the strip electrodes are fed with a same driving voltage, and two grating periods are formed between two neighboring strip electrodes.

7. The transparent display panel of claim 3, wherein the strip electrodes are transparent oxide semiconductor electrodes, and are configured to be fed with driving voltages through different data lines.

8. The transparent display panel of claim 1, wherein the color filter substrate comprises a color filter layer, and the color filter layer is a quantum dot color filter layer.

9. The transparent display panel of claim 1, wherein the light exit region of the light guide plate is provided with a light extract grating, and the collimated natural light which passes through the light extract grating is incident on the blue phase liquid crystal layer.

10. The transparent display panel of claim 1, wherein the light guide plate comprises a light shielding part and a light exit region surrounded by the light shielding part on a light exit surface, and the collimated natural light which passes through the light exit region is incident on the blue phase liquid crystal layer.

11. The transparent display panel of claim 1, wherein the grating period is smaller than 10 μm.

12. A transparent display device, comprising the transparent display panel of claim 1, and a light source configured to provide the collimated natural light for the transparent display panel.

13. The transparent display device of claim 12, wherein the light source is arranged as a side entry type light source for the light guide plate.

14. The transparent display panel of claim 1, wherein the color filter substrate comprises a color filter layer, and the color filter layer is a color filter layer doped with scattering particles.

15. The transparent display device of claim 12, wherein the light source is arranged as a direct type light source for the light guide plate.

* * * * *